No. 671,091. Patented Apr. 2, 1901.
R. R. PACE.
BALING PRESS.
(Application filed Oct. 29, 1900.)
(No Model.) 3 Sheets—Sheet 1.
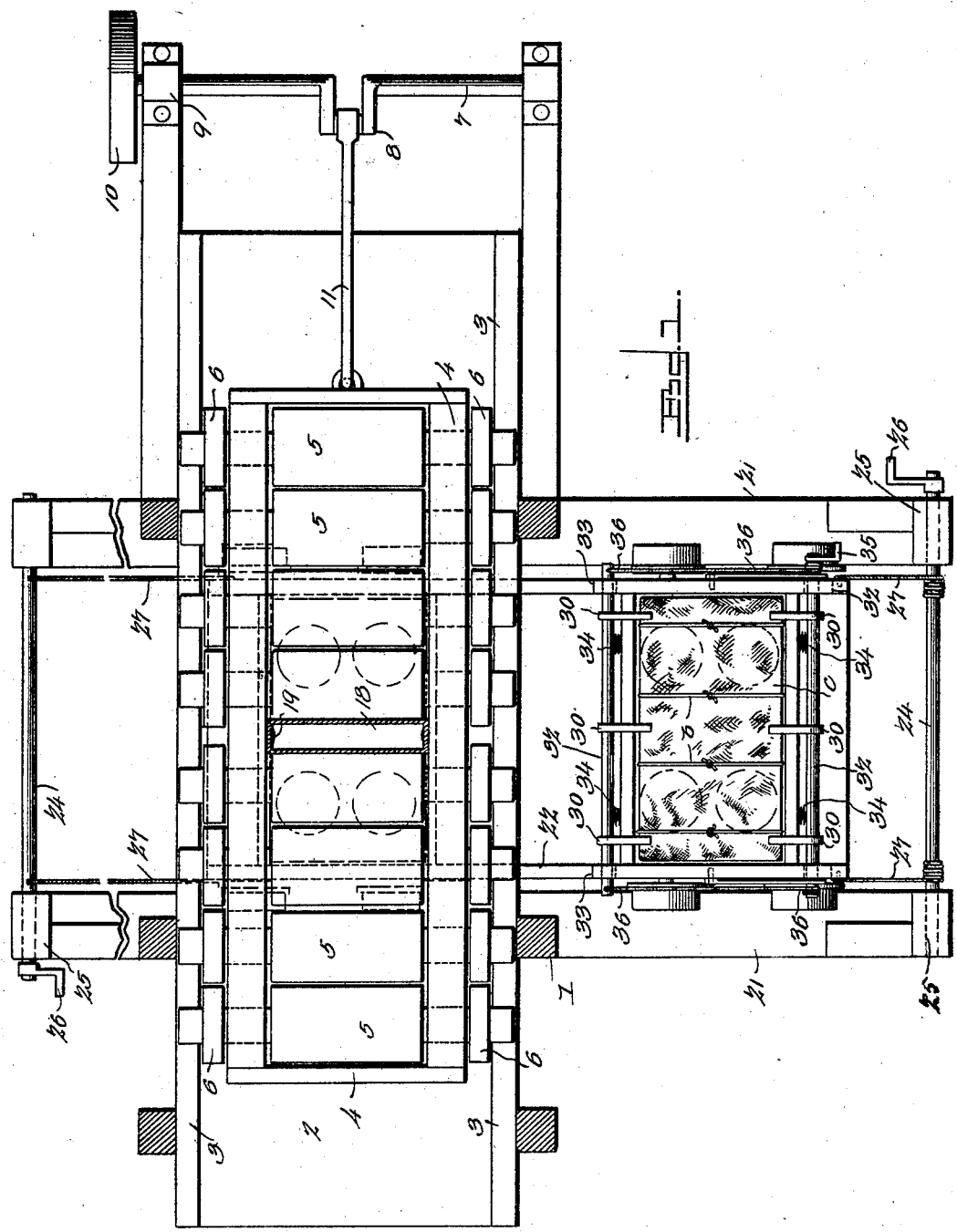
Witnesses
Richard R. Pace Inventor

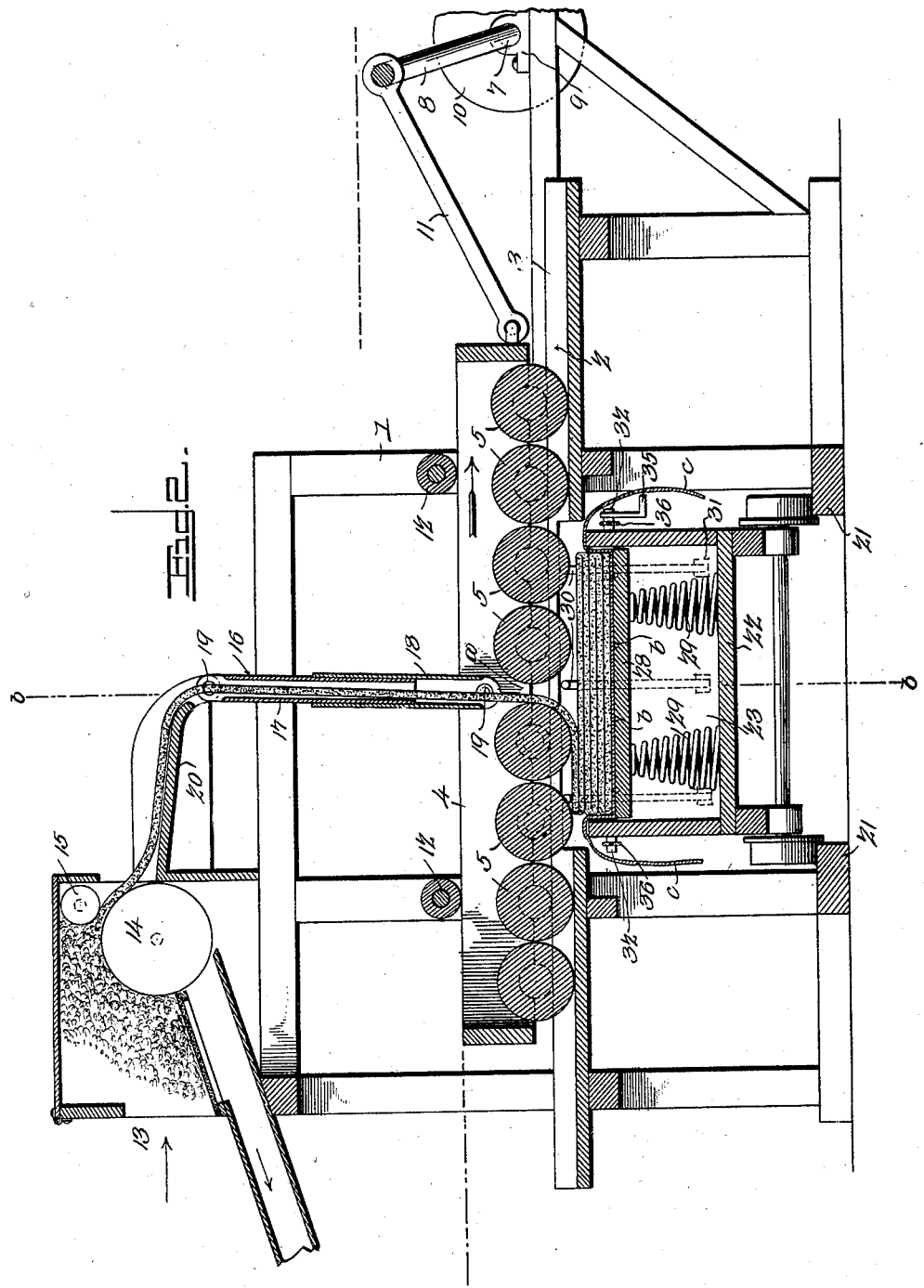

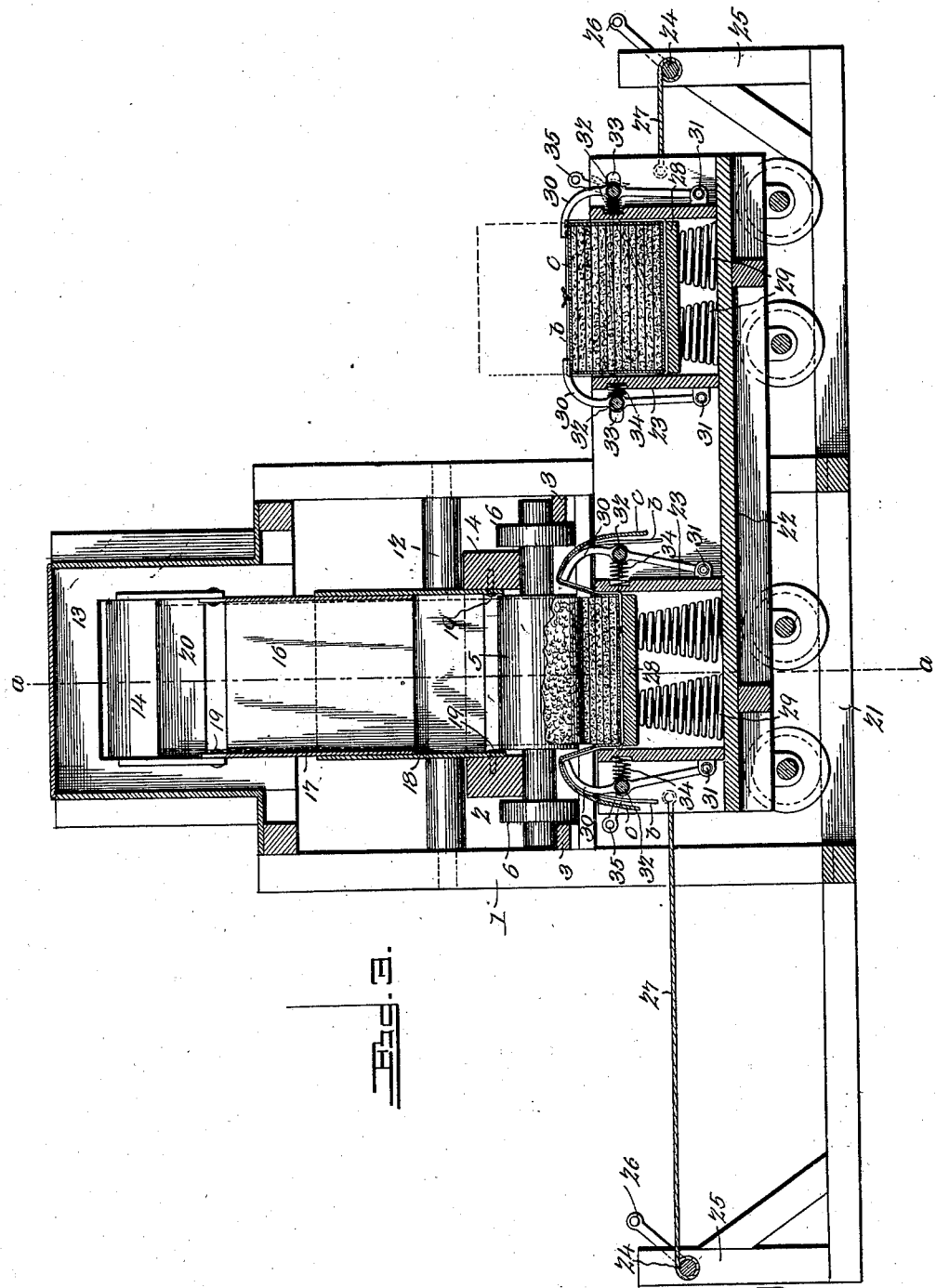

UNITED STATES PATENT OFFICE.

RICHARD R. PACE, OF LISBON, LOUISIANA.

BALING-PRESS.

SPECIFICATION forming part of Letters Patent No. 671,091, dated April 2, 1901.

Application filed October 29, 1900. Serial No. 34,834. (No model.)

*To all whom it may concern:*

Be it known that I, RICHARD R. PACE, a citizen of the United States, residing at Lisbon, in the parish of Claiborne and State of Louisiana, have invented a new and useful Baling-Press, of which the following is a specification.

My invention is an improved baling-press adapted to form bales from cotton-bat or the like fed to the press-box and disposed therein in superimposed layers which are successively compressed as they are deposited in the press-box, whereby the bales are of maximum density and are produced with a minimum expenditure of power.

One object of my invention is to effect improvements in the construction of the press-box to facilitate the bagging and tying of the bale formed therein and the removal of the bale therefrom.

A further object of my invention is to effect improvements in the construction of the feed-tube for feeding the cotton-bat to the press from the condenser.
A further object of my invention is to combine with a reciprocating frame carrying compressing-rolls a press-box under said compressing-rolls and movable in a path at an angle to that of the roll-frame whereby said press-box may be run under and out from said compressing-rolls, said press-box having a compressing-bottom movable toward and from the said compressing-rolls and means to apply pressure to said compressing-bottom.
My invention consists in the peculiar construction and combination of devices hereinafter fully set forth, and pointed out in the claims.

In the accompanying drawings, Figure 1 is a top plan view of a baling-press embodying my improvements. Fig. 2 is a sectional view of the same, taken on a plane indicated by the line $a\,a$ of Fig. 3. Fig. 3 is a similar view taken on a plane indicated by the line $b\,b$ of Fig. 2.

In the embodiment of my invention I provide a supporting-frame 1, which may be of any suitable construction and is provided with an elevated race or way 2, having supporting track-rails 3. A reciprocating frame 4 is provided with a series of compressing-rolls 5, which are journaled therein and are provided at the ends of their respective shafts with supporting-wheels 6, which operate on the track-rails 3. Thereby the frame 4 is supported and is adapted to move longitudinally in the race or way 2. Any suitable means may be employed to impart reciprocating motion to the roller-frame. In the form of my invention herein shown I provide an operating-shaft 7, which is provided with a crank 8 at its center. This shaft is journaled in bearings, as at 9, and at one end of the race or way 2 is provided with a power-pulley 10 or other means whereby power may be applied to the said shaft and the same rotated, and a pitman 11 connects the crank 8 of said shaft with one end of the roller-frame 4, as shown. Rollers 12, which are mounted in the frame 1, bear upon the upper side of the frame 4, the latter moving under the said rollers, and said rollers maintaining the said frame against vertical displacement under pressure applied to the lower sides of the compressing-rolls.

On the frame 1 is a suitable condenser, which is indicated at 13 and to which lint-cotton is fed from the gins, the condensing-rollers 14 15 serving to condense the cotton into a continuous bat, which is fed therefrom through a space (indicated at $a$) between the central pair of compressing-rolls in the frame 4 by a tube 16. The said feed-tube is composed of two sections 17 18, which telescope the one within the other, and are respectively pivotally connected at their upper and lower ends, as at 19, to the delivery-trough 20 of the condenser and within the sides of the roller-frame 4.

At right angles to the race or way 2 in which the reciprocating compressor-roller frame travels and below the said race 2 is a trackway 21, on which travels a car 22, which may be of any suitable construction and is provided near its ends with a pair of press-boxes 23, which are by the car adapted to be successively disposed below the path of the compressing-rolls.

Any suitable means may be employed for moving the car 22. In the form of my invention herein shown I provide a pair of winding-drums 24, which are mounted at the ends of the trackway 21, as at 25, and are provided with hand-cranks 26, whereby they may be rotated. Each of the said drums is connected to one end of the car 22 by a rope 27.

In each of the press-boxes is a compressing-bottom 28, which is movable in the press-box toward and from the compressing-rolls, said compressing-bottom and the said compressing-rolls coacting to compress the successive layers of cotton-bat, which are fed to the press box and disposed therein, as shown in Fig. 2 of the drawings, by the reciprocating movement of the frame 4. The movable compressing-bottom is supported and pressure is applied thereto by springs 29 of suitable strength and of any suitable form. Thereby the compressing-bottom of the press-box is adapted to yield as the superincumbent layers of bat accumulate in the press-box during the operation of the press, and in this manner a bale composed of superincumbent layers of bat may be formed in the press-box, as will be readily understood. Prior to the operation of the press to form a bale in a press-box suitable bale-ties (indicated at $b$) and a suitable bagging to cover the bale (indicated at $c$) are placed in the press-box, over the compressing-bottom thereof.

I do not limit myself to the use of springs to support and apply pressure to the compressing bottom of the press-box, as other suitable means may be employed in lieu of the springs to accomplish the same purposes.

On each side of each press-box are a series of hooks 30, which are hinged or pivotally connected at their lower ends to the outer sides of the press-boxes, as at 31. The said hooks are adapted at their upper ends to extend over and project within the vertical sides of the press-box when turned to nearly a vertical position, as shown at the right of Fig. 2, and to clear the space between the sides of the press-box when moved outwardly therefrom, as shown to the left of Fig. 3. Each series of hooks 30 is connected by a roller-shaft 32. The said roller-shafts operate in longitudinally-disposed slots 33 in the sides of the car, which sides form the ends of the press-boxes, and springs 34 are interposed between the said roller-shafts and the sides of the press-boxes and serve to normally open the said hooks from above the said press-boxes. One of the roller-shafts of each pair is provided with a hand-crank 35 whereby the same may be rotated, and ropes 36 are coiled on the said crank roller-shaft of each pair and connected to the other roller of said pair, and hence the said pairs of roller-shafts may be readily moved toward or from each other to close the hooks over the press-boxes or to open the same therefrom.

When a sufficient quantity of cotton-bat has been compressed in one of the press-boxes to form a bale therein, the hooks of the said press-box are operated so as to close over the same and engage the upper side of the bale and fold the bagging over the same. The car 22 is then moved so as to dispose the other press-box under the path of the compressing-rollers and run the press-box in which the bale has been formed out from the said compressing-rollers to permit the same to be tied and the bagging to be properly secured thereon. While this is being done and while the completed bale is being removed from the press-box, which is done automatically by the springs 29 and the movable bottom of the press-box as soon as the hooks are released from the bale, another bale is being formed in the other press-box, and hence the operation of the press is practically continuous.

I do not desire to limit myself to the precise construction and combination of devices hereinbefore shown and described, as it is evident that modifications may be made therein without departing from the spirit of my invention.

Having thus described my invention, I claim—

1. The combination with compressing-rolls, a press-box and means to move the same under and from the rolls, a compressing-bottom in the press-box, means to exert pressure thereon, hooks adapted to engage the upper side of a bale formed in the said press-box, for the purpose set forth, and means to simultaneously operate said hooks, substantially as described.

2. The combination with compressing-rolls, a press-box and means to move the same under and from the rolls, a compressing-bottom in the press-box, means to exert pressure thereon, hooks pivoted to the sides of the press-box and adapted to engage the upper side of the bale formed therein, springs to normally disengage the said hooks and means to engage said hooks against the tension of said springs, substantially as described.

In testimony that I claim the foregoing as my own I have hereto affixed my signature in the presence of two witnesses.

RICHARD R. PACE.

Witnesses:
 DREW FERGUSON,
 E. H. FORTSUN.